United States Patent [19]
Uchida et al.

[11] Patent Number: 5,513,091
[45] Date of Patent: Apr. 30, 1996

[54] VOLTAGE TRANSFORMING CIRCUIT

[75] Inventors: Hideaki Uchida, Sagamihara; Kouji Oohashi, Yokohama, both of Japan

[73] Assignee: Kabushiki Kaisha Toshiba, Kawasaki, Japan

[21] Appl. No.: 409,092

[22] Filed: Mar. 23, 1995

[30] Foreign Application Priority Data

Mar. 29, 1994 [JP] Japan .................................. 6-058411

[51] Int. Cl.$^6$ ............................. H02M 3/18; H03K 3/01
[52] U.S. Cl. ............................................ 363/60; 327/536
[58] Field of Search ............................. 363/59, 60, 147; 327/535, 536, 537, 538

[56] References Cited

U.S. PATENT DOCUMENTS

| | | | |
|---|---|---|---|
| 4,962,512 | 10/1990 | Kiuchi | 377/78 |
| 4,970,409 | 11/1990 | Wada et al. | 363/60 |
| 5,051,882 | 9/1991 | Grimm et al. | 363/60 |
| 5,059,838 | 10/1991 | Motegi et al. | 327/534 |
| 5,394,027 | 2/1995 | Park | 327/536 |
| 5,432,469 | 7/1995 | Tedrow | 327/306 |

Primary Examiner—Matthew V. Nguyen
Attorney, Agent, or Firm—Oblon, Spivak, McClelland, Maier & Neustadt

[57] ABSTRACT

A voltage transforming circuit comprises a constant-voltage regulator circuit for receiving a first voltage from a first voltage source and outputting a second voltage having the same polarity as the first voltage and a predetermined absolute value lower than the same, a step-up circuit, having a plurality of output terminals, for receiving the second voltage and a first synchronization signal, the step-up circuit stepping up the absolute value of the second voltage and controlling the operation of charging capacitors, thereby outputting from the output terminals a plurality of stepped-up voltages of the same polarity having absolute values higher than the second voltage, a level shifter circuit for receiving a second synchronization signal which uses the first voltage as one of logic levels, and receiving that one of the stepped-up voltages which has a highest absolute value higher than that of the first voltage, the level shifter circuit shifting the voltage of the one of logic levels to the highest absolute value of the stepped-up voltages, thereby creating the first synchronization signal, and a one-way conductive element connected between the first voltage source and that one of the output terminals of the step-up circuit from which the stepped-up voltage of the highest absolute value is output.

14 Claims, 6 Drawing Sheets

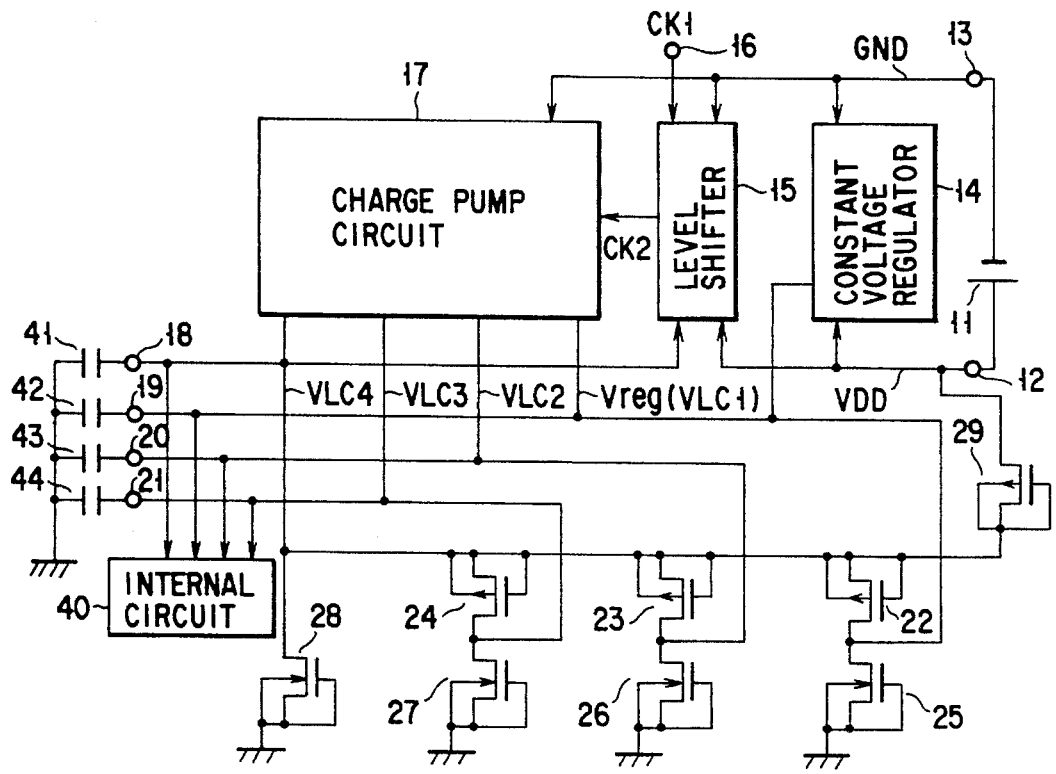
F I G. 4
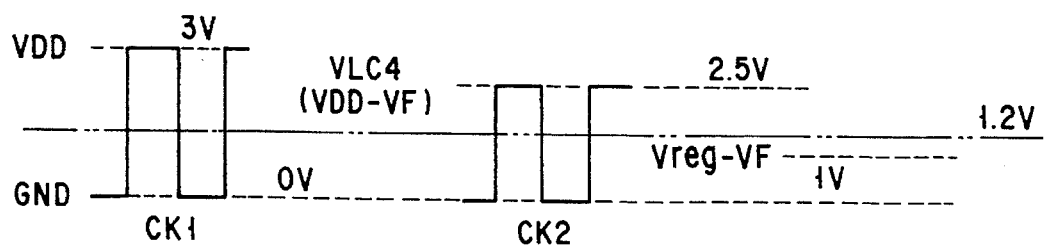
F I G. 5

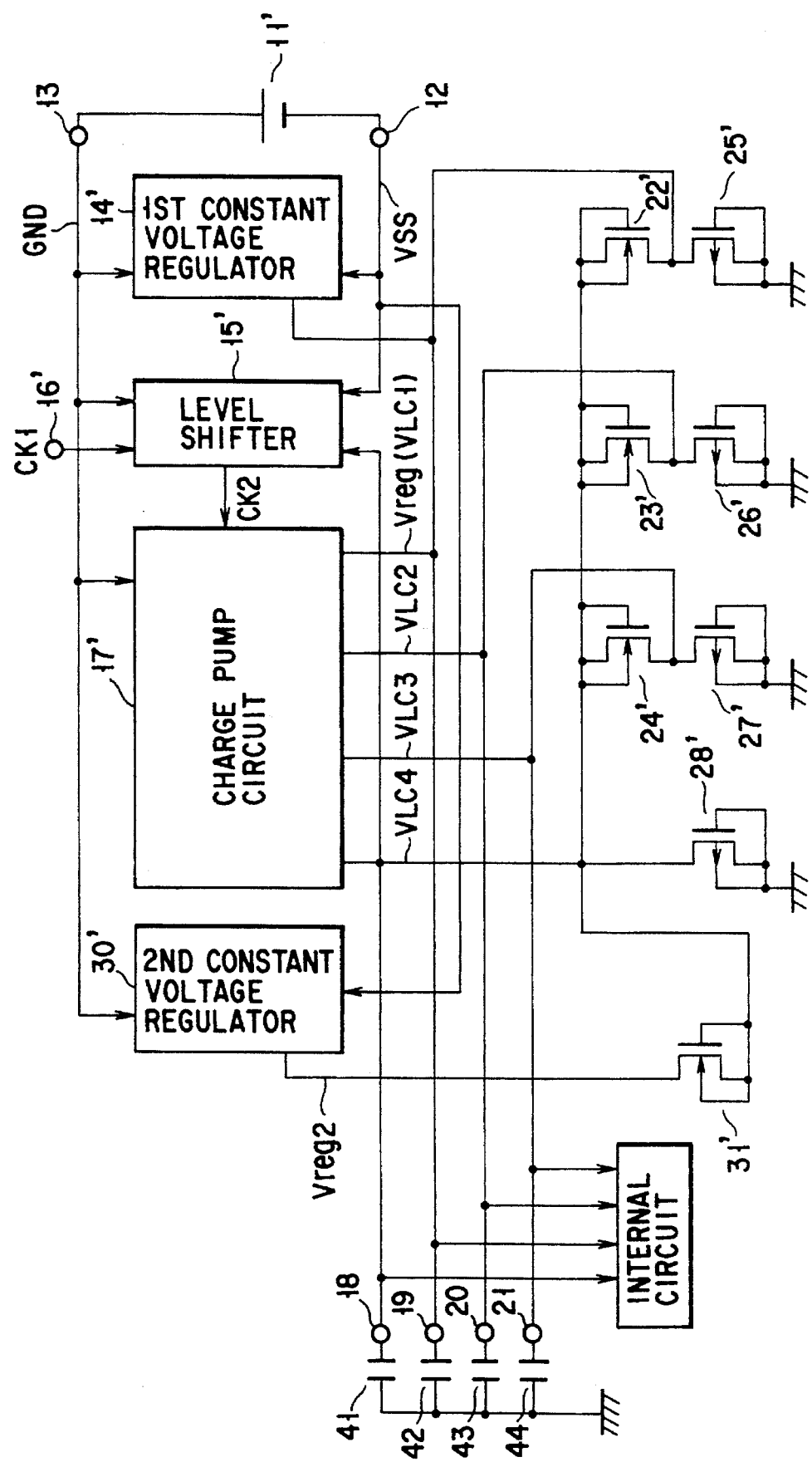
F I G. 10

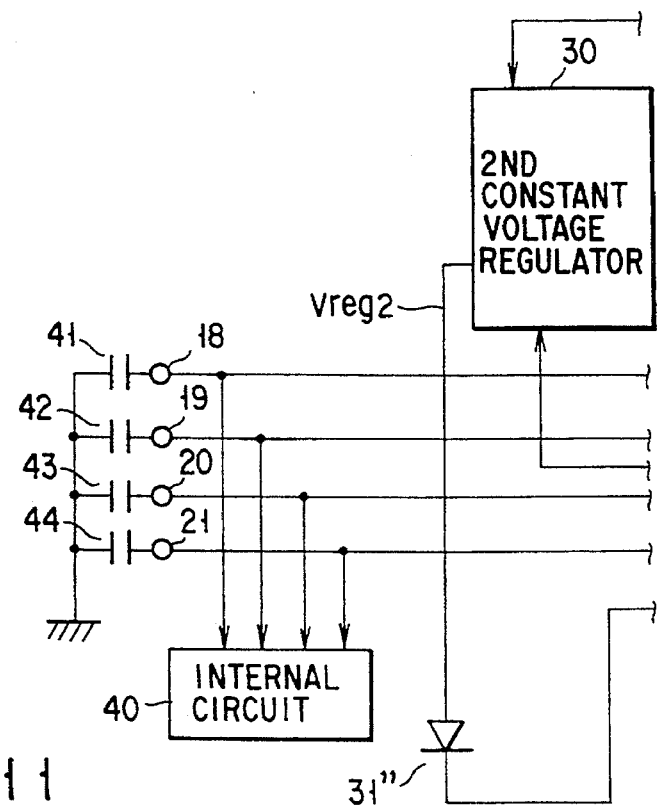
F I G. 11
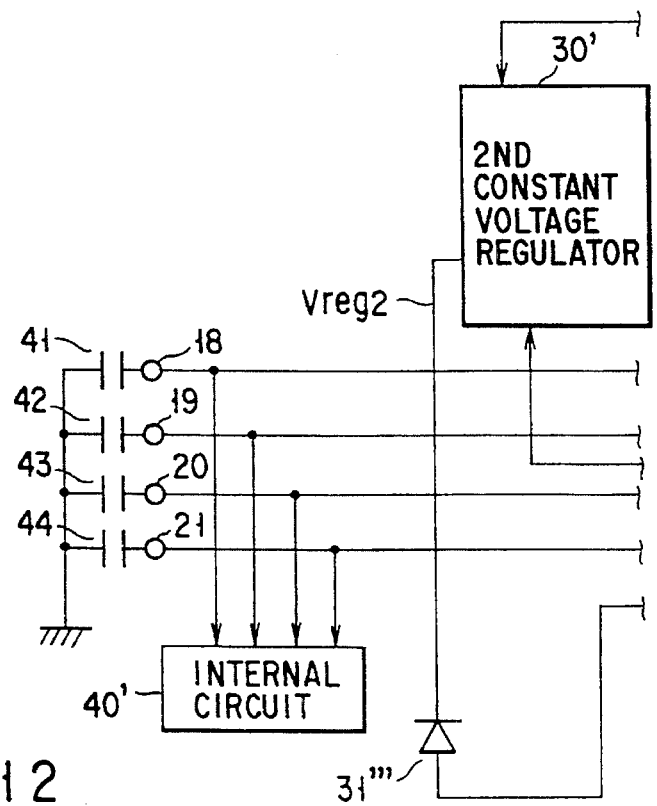
F I G. 12

VOLTAGE TRANSFORMING CIRCUIT

BACKGROUND OF THE INVENTION

1. Field of the Invention

This invention relates to a voltage transforming circuit for generating different voltages from an input voltage, and more particularly to a circuit of this kind which is incorporated in an integrated circuit.

2. Description of the Related Art

In the field of compact business machines such as an electronic calculator and a personal digital assistant, liquid crystal display units are employed to save power or to make the machine compact. A liquid crystal display unit uses AC signals in order to lengthen its life. It is necessary to apply different voltages to create AC signals. The different voltages are generally created from a single source voltage by means of a voltage transforming circuit.

FIG. 1 is a block diagram, showing a conventional integrated voltage-transforming circuit used for such a purpose. This circuit transforms the output voltage VDD of a battery 11 into four different voltages Vreg (VLC1), VLC2, VLC3, VLC4. The high-potential-side voltage VDD and the reference-potential-side voltage GND of the battery 11 are applied via external terminals 12 and 13 to the integrated circuit including the voltage transforming circuit. In the integrated circuit, a predetermined voltage Vreg lower than the voltage VDD is created from the voltage VDD by means of a constant-voltage regulator 14. The voltage VDD is input to a level shifter 15. The level shifter 15 further receives a voltage VLC4, which is the highest one of voltages generated by a step-up circuit explained later, and a clock signal CK1 supplied via the external terminal 16 from the outside of the integrated circuit. The level shifter 15 shifts the level of a high-level portion of the clock signal CK1 from the voltage VDD to the voltage VLC4, thereby outputting a clock signal CK2 with an amplitude between the voltages VLC4 and GND. The clock signal CK2 obtained by level shifting of the level shifter 15 is supplied to a step-up circuit 17, together with the voltage Vreg. The step-up circuit 17 steps up the voltage Vreg to create a stepped-up voltage VLC2 two times the voltage Vreg, a stepped-up voltage VLC3 three times the voltage Vreg, and a stepped-up voltage VLC4 four times the voltage Vreg. The step-up circuit 17 is a well-known charge pump circuit of a capacitor-coupling type using capacitors, and generates a desired stepped-up voltage by connecting capacitors 41–44 to external terminals 18–21. The external terminals 18–21 are connected to an internal circuit 40, such as a circuit for generating a liquid crystal-driving signal, to apply thereto a driving voltage. The clock signal CK2 is used as a synchronization signal for controlling the step-up operation of the step-up circuit 17.

Further, it is necessary to provide capacitors outside the integrated circuit so as to cause the step-up circuit 17 to perform the step-up operation. For this purpose, the external terminals 18–21 are provided. However, it is known that a surge voltage such as static electricity may be applied to the external terminals of the integrated circuit. Since the external terminals 18–21 are directly connected to internal elements of the integrated circuit, such as transistors employed in the step-up circuit 17, it is possible that the step-up circuit 17 and the internal circuit will be broken when such a surge voltage has been applied to the external terminals 18–25. To prevent this, protect elements for protecting the internal circuit from the surge voltage are connected to the external terminals 18–21. In the case of a MOS-type integrated circuit which employs MOS transistors used as active elements, P-channel MOS transistors 22–24 and N-channel MOS transistors 25–28 are used as protect elements, as shown in FIG. 1. Each of these MOS transistors has its gate, source and back gate connected to each other, and an element equivalent to a diode is formed between the connection node and the drain.

The operation of the conventional circuit constructed as above, assumed when the relationship of VLC4>VDD>Vreg is established and the step-up circuit 17 is operating in a stable manner, will be explained. Suppose that a compact business machine such as an electric calculator or a personal digital assistant driven by a battery of 3 V is used. Further, suppose that the voltage Vreg is 1.5 V, VLC4 6 V (1.5×4), the voltage VDD 3 V, the minimum operation-guarantee voltage of the level shifter 15 (hereinafter referred to as "VDDmin") 1.2 V, and the forward voltage of each diode (hereinafter referred to as "VF") 0.5 V. In a state assumed immediately after the step-up circuit 17 starts the step-up operation, the voltage Vreg is higher than the voltage VLC4, and a forward current flows from the Vreg terminal to the VLC4 terminal via the P-channel MOS transistor 22 as a protect element. Thus, an initial voltage is applied to the VLC4 terminal.

The above-described protect element, however, raises the following problems:

FIG. 2 shows the input waveform (CK1) of the level shifter 15, and the output waveform (CK2) of the same obtained after the step-up operation of the step-up circuit 17 is stabilized. Further, FIG. 3 shows the input waveform (CK1) of the level shifter 15 obtained in an initial state immediately after the step-up operation of the step-up circuit 17 starts, as well as the voltages VDD, VCL4, Vreg and VDDmin. As is shown in FIG. 3, in the initial state, the voltage VLC4 is lower than the voltage Vreg, and therefore a forward current flows from the Vreg terminal to the VLC4 terminal. At this time, the VLC4 terminal has a potential of 1 V lower than the voltage Vreg (1.5 V) by the voltage VF (0.5 V) of the diode. Therefore, where the voltage VLC4 (=Vreg−VF) is lower than the voltage VDDmin of the level shifter 15, for example, immediately after the integrated circuit is turned on, the level shifter 15 does not operate, and the step-up circuit 17 which is controlled by the clock signal CK2 output from the level shifter 15 does not operate.

To avoid such inconvenience, the output voltage Vreg of the constant-voltage regulator 14 must be set higher than 1.5 V. However, in order to cause the integrated circuit to be operable under a wide range of input voltages, for example, when the voltage VDD ranges from 1.8 V to 3.3 V, the output voltage Vreg of the constant-voltage regulator 14 must be set to approx. 1.5 V. If the voltage Vreg is set higher than 1.5 V, the lower limit of the input voltage is limited to a value higher than in the case of the Vreg being 1.5 V, which degrades the versatility of the integrated circuit. Moreover, there is a case where the voltage Vreg is calculated from the specification related to the voltages VLC2, VLC3 and VLC4.

As described above, in the conventional voltage transforming circuit in which a plurality of voltages are obtained by stepping up the input voltage, an initial voltage is supplied via the protect elements for protecting the internal circuit from a surge voltage applied to the external terminals. With such an initial voltage, it is possible that the voltage transforming circuit is not normally operated at the time of turning the integrated circuit on. In this case, desired output voltages cannot be obtained.

SUMMARY OF THE INVENTION

It is the object of the invention to provide a voltage transforming circuit capable of normally operating an internal circuit irrespective of a stepped-up voltage, thereby generating desired output voltages in a reliable manner.

According to a first aspect of the invention, there is provided a voltage transforming circuit comprising:

a constant-voltage regulator circuit for receiving a first voltage from a first voltage source and outputting a second voltage having the same polarity as the first voltage and a predetermined absolute value lower than the same;

a step-up circuit, having a plurality of output terminals, for receiving the second voltage and a first synchronization signal, the step-up circuit stepping up the absolute value of the second voltage and controlling the operation of charging capacitors, thereby outputting from the output terminals a plurality of stepped-up voltages of the same polarity having absolute values higher than the second voltage;

a level shifter circuit for receiving a second synchronization signal which uses the first voltage as one of logic levels, and receiving that one of the stepped-up voltages which has a highest absolute value thereamong higher than that of the first voltage, the level shifter circuit shifting the voltage of the one of logic levels to the highest absolute value of the stepped-up voltages, thereby creating the first synchronization signal; and a one-way conductive element connected between the first voltage source and that one of the output terminals of the step-up circuit from which the stepped-up voltage of the highest absolute value is output, so that a voltage substantially equal to the first voltage can be applied to the one of the output terminals immediately after the first voltage is applied to the constant-voltage regulator circuit.

According to a second aspect of the invention, there is provided a voltage transforming circuit comprising:

a first constant-voltage regulator circuit for receiving a first voltage from a first voltage source and outputting a second voltage having the same polarity as the first voltage and a predetermined absolute value lower than the same;

a step-up circuit, having a plurality of output terminals, for receiving the second voltage and a first synchronization signal, the step-up circuit stepping up the absolute value of the second voltage and controlling the operation of charging capacitors, thereby outputting from the output terminals a plurality of stepped-up voltages of the same polarity having absolute values higher than the second voltage;

a level shifter circuit for receiving a second synchronization signal which uses the first voltage as one of logic levels, and receiving that one of the stepped-up voltages which has a highest absolute value thereamong, the level shifter circuit shifting the voltage of the one of logic levels, to the highest absolute value of the stepped-up voltages, thereby creating the first synchronization signal;

a second constant-voltage regulator circuit having an input terminal for receiving the first voltage, and an output terminal for outputting a third voltage having a predetermined absolute value lower than that of the first voltage and higher than that of the second voltage, and having the same polarity as the first and second voltages; and a one-way conductive element connected between the output terminal of the third voltage and that one of the output terminals of the step-up circuit from which the stepped-up voltage of the highest absolute value is output, so that a voltage substantially equal to the third voltage can be applied to the one of the output terminals of the step-up circuit immediately after the first voltage is applied to the first constant-voltage regulator circuit.

In the voltage transforming circuit as viewed from the first aspect, at the start of the operation, a current flows via the one-way conductive element from the first voltage source to the one of the output terminals of the step-up circuit from which the stepped-up voltage of the highest absolute value is output, thus setting the initial value of the stepped-up voltage of the highest absolute value, to the first voltage.

In the voltage transforming circuit as viewed from the second aspect, at the start of the operation, a current flows via the one-way conductive element from the second constant-voltage regulator circuit to the one of the output terminals of the step-up circuit from which the stepped-up voltage of the highest absolute value is output, thus setting the initial value of the stepped-up voltage of the highest absolute value, to the third voltage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram, showing a voltage transforming circuit according to a first embodiment of the invention;

FIG. 5 is a view of the waveforms of signals CK1 and CK2, useful in explaining the operation of the first embodiment of the invention;

FIG. 10 is a block diagram, showing a modification of the voltage transforming circuit according to the second embodiment of the invention; and FIGS. 11 and 12 are block diagrams, showing part of further modifications of the voltage transforming circuit according to the second embodiment of the invention.

DETAILED DESCRIPTION OF THE PREFERRED EMBODIMENTS

The embodiments of the invention will be explained with reference to the accompanying drawings.

Figure 1:
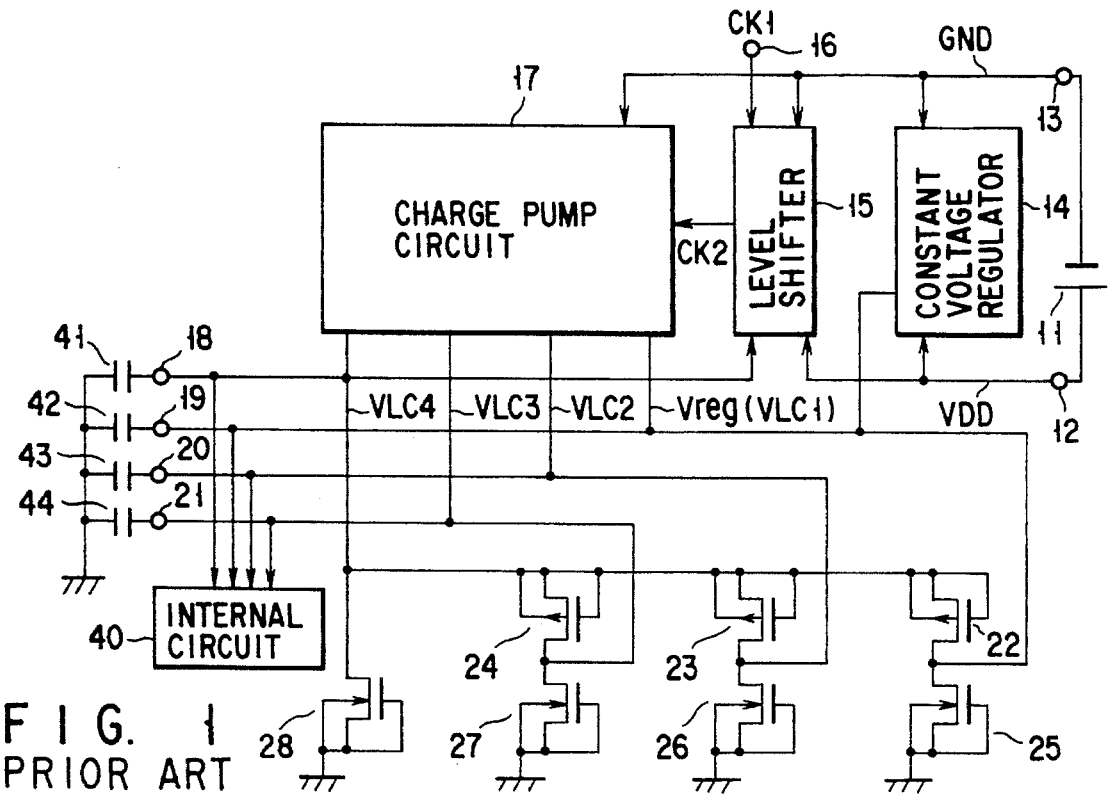
FIG. 1 is a block diagram, showing a conventional voltage transforming circuit.

FIG. 4 is a block diagram, showing a voltage transforming circuit according to a first embodiment of the invention. The voltage transforming circuit of this embodiment is similar to the conventional circuit of FIG. 1 in that it is incorporated in an integrated circuit and arranged to transform the output voltage VDD of a battery into four different voltages Vreg (VLC1), VLC2, VLC3 and VLC4. In FIG. 4, elements similar to those of the conventional circuit of FIG. 1 are denoted by corresponding reference numerals. The high-potential-side voltage (positive voltage) VDD and the reference-potential-side voltage GND of a battery 11 are applied via external terminals 12 and 13 to the integrated circuit including the voltage transforming circuit. In the integrated circuit, a predetermined voltage Vreg lower than the voltage VDD is created from the voltage VDD by means of a constant-voltage regulator 14. A widely-known constant-voltage regulator can be used as the regulator 14. The voltage VDD is also input to a level shifter 15. The level shifter 15 further receives a voltage VLC4, which is the highest one of voltages generated by a step-up circuit explained later, and a clock signal CK1 supplied via the external terminal 16 from the outside of the integrated circuit. The level shifter 15 shifts the level of a high-level portion of the clock signal CK1 from the voltage VDD to the voltage VLC4, thereby outputting a clock signal CK2 with an amplitude between the voltages VLC4 and GND. This is done because the step-up circuit 17 treats the voltage VLC4 higher than the voltage VDD, and accordingly the clock signal need be stepped up to the voltage VLC4 to enable a normal operation of the circuit 17. A well-known level shifter circuit can be used as the level shifter 15. The clock signal CK2 obtained by level shifting of the level shifter 15 is supplied to a step-up circuit 17, together with the voltage Vreg. The step-up circuit 17 steps up the voltage Vreg to create a stepped-up voltage VLC2 two times the voltage Vreg, a stepped-up voltage VLC3 three times the voltage Vreg, and a stepped-up voltage VLC4 four times the voltage Vreg. The step-up circuit 17 is a well-known charge pump circuit of a capacitor-coupling type using capacitors, and generates a desired stepped-up voltage by connecting capacitors 41–44 to external terminals 18–21. The external terminals 18–21 are connected to an internal circuit such as a circuit for generating a liquid crystal-driving signal. The clock signal CK2 is used as a synchronization signal for controlling the step-up operation of the step-up circuit 17.

Between the output terminal of the voltage Vreg and the output terminal of the voltage VLC4, the drain and the source of a P-channel MOS transistor 22 are connected. The PMOS transistor 22 serves as a protect element for protecting the internal circuit from the surge voltage. The gate and back gate of the PMOS transistor 22 are connected to the source of the same. Thus, the PMOS transistor 22 is equivalent to a diode having an anode and a cathode. The drain side and source side of the PMOS transistor 22 correspond to the anode and cathode of the diode, respectively. The drain and source of a P-channel MOS transistor 23 are connected between the output terminal of the voltage VLC2 and the output terminal of the voltage VLC4, and the drain and source of a P-channel MOS transistor 24 are connected between the output terminal of the voltage VLC3 and the output terminal of the voltage VLC4. The PMOS transistors 23 and 24 also serve as protect elements. Like the PMOS transistor 22, the gate and back gate of the PMOS transistor 23 (or 24) are connected to the source of the same. Thus, each of the transistors 23 and 24 are equivalent to a diode having an anode and a cathode. Similarly, the drain and source of an N-channel MOS transistor 25 are connected between the output terminal of the voltage Vreg and the ground voltage, those of an N-channel MOS transistor 26 between the output terminal of the voltage VLC2 and the ground voltage, those of an N-channel MOS transistor 27 between the output terminal of the voltage VLC3 and the ground voltage, and those of an N-channel MOS transistor 28 between the output terminal of the voltage VLC4 and the ground voltage. These NMOS transistors serves as protect elements for protecting the internal circuit from the surge voltage. The gate and back gate of each NMOS transistor are connected to the source of the same. Thus, the NMOS transistors are equivalent to a diode having an anode and a cathode. Further, in the circuit of this embodiment, the drain and source of a P-channel MOS transistor 29 for setting the initial value of the voltage VLC4 are connected to the external terminal 12 of the voltage VDD from the battery 11 and the output terminal of the voltage VLC4, respectively. The gate and back gate of the PMOS transistor 29 are connected to the source of the same. The transistor 29 is equivalent to a diode (a one-way conductive element). The VDD side and VLC4 side of the transistor 29 correspond to the anode and cathode of the diode, respectively.

As described above, in the circuit constructed as above, the constant-voltage regulator 14 creates the predetermined voltage Vreg lower than the voltage VDD is created from the voltage VDD, and the step-up circuit 17 creates three different stepped-up voltages VLC2–VLC4 on the basis of the voltage Vreg, and supplies the voltages VLC2–VLC4 to the internal circuit 40 or to a circuit for generating a liquid crystal-driving signal (not shown) connected to a peripheral circuit of the integrated circuit. This circuit, in turn, generates an AC signal for driving a liquid crystal unit.

The operation of the integrated circuit constructed as above, assumed when the relationship of VLC4>VDD>Vreg is established and the step-up circuit 17 is operating in a stable manner, will be explained. In this case, too, suppose that a compact business machine such as an electric calculator or a personal digital assistant is used. Further, suppose that the voltage Vreg is 1.5 V, VLC4 6 V (1.5×4), the voltage VDD 3 V, the minimum operation-guarantee voltage of the level shifter 15 (hereinafter referred to as "VDDmin") 1.2 V, and the forward voltage of each diode (hereinafter referred to as "VF") 0.5 V. In a state assumed immediately after the step-up circuit 17 starts the step-up operation, the voltage Vreg is higher than the voltage VLC4, and a forward current flows from the Vreg terminal to the VLC4 terminal via the P-channel MOS transistor 22. Moreover, the voltage VDD is higher than the voltage VLC4, and accordingly a forward current flows from the VDD input terminal to the VLC4 output terminal via the P-channel MOS transistor 29. Since at this time the voltage Vreg (1.5 V) is lower than voltage VDD (3 V), the PMOS transistor 22 is in the off-state, and an initial voltage based on the higher value of the voltage VDD is applied to the VLC4 output terminal. Specifically, since the VF of the diode is 0.5 V, the initial voltage applied to the VLC4 terminal is 2.5 V (=VDD (3 V)–VF (0.5 V)).

Figure 2:
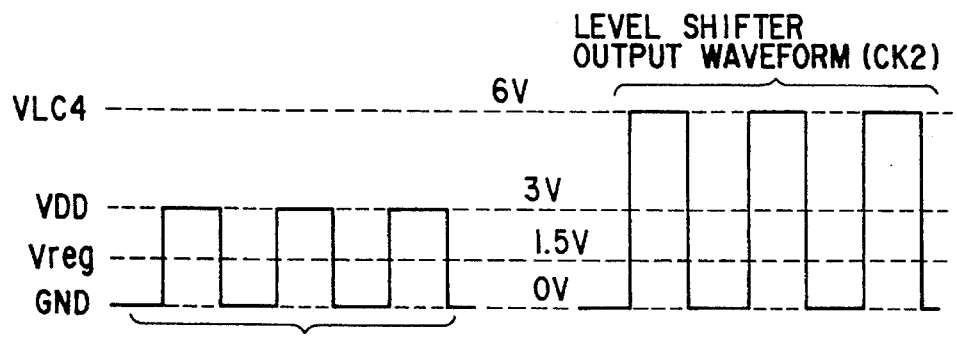
FIG. 2 is a view, showing the waveforms of synchronization signals CK1 and CK2 obtained during a normal operation of the conventional voltage transforming circuit.
Figure 3:
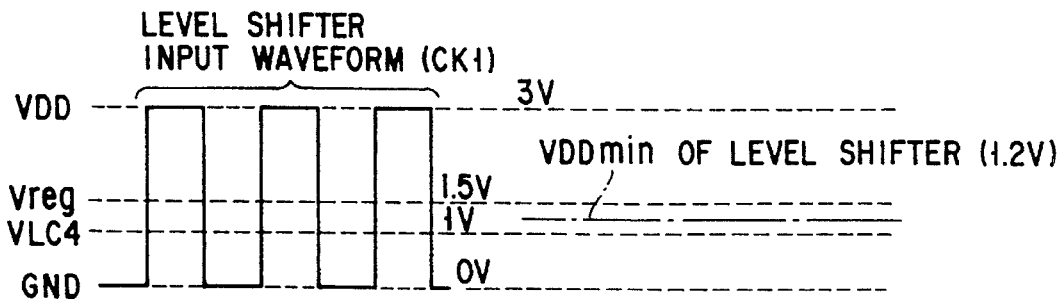
FIG. 3 is a view, useful in comparing a voltage VLC4 with voltages VDD and Vreg at the time of turning on the conventional voltage transforming circuit.

FIG. 5 shows the input waveform (CK1) and output waveform (CK2) of the level shifter 15 which is in an initial state immediately after the step-up circuit 17 starts the step-up operation, together with the voltages VDD, VLC4 and VDDmin. As is shown in FIG. 5, the voltage VLC4 (i.e., VDD–VF) is higher than the voltage VDDmin of the level shifter 15 even in the initial state, and therefore the shifter 15 can operate in a reliable manner. Accordingly, the step-up circuit 17 controlled by the clock signal CK2 output from the level shifter 15 can reliably operate. The output waveform CK2 of the level shifter 15 assumed when the operation of the step-up circuit 17 has been stabilized has an amplitude between the voltages VLC4 and GND, as in the FIG. 2 case.

Figure 6:
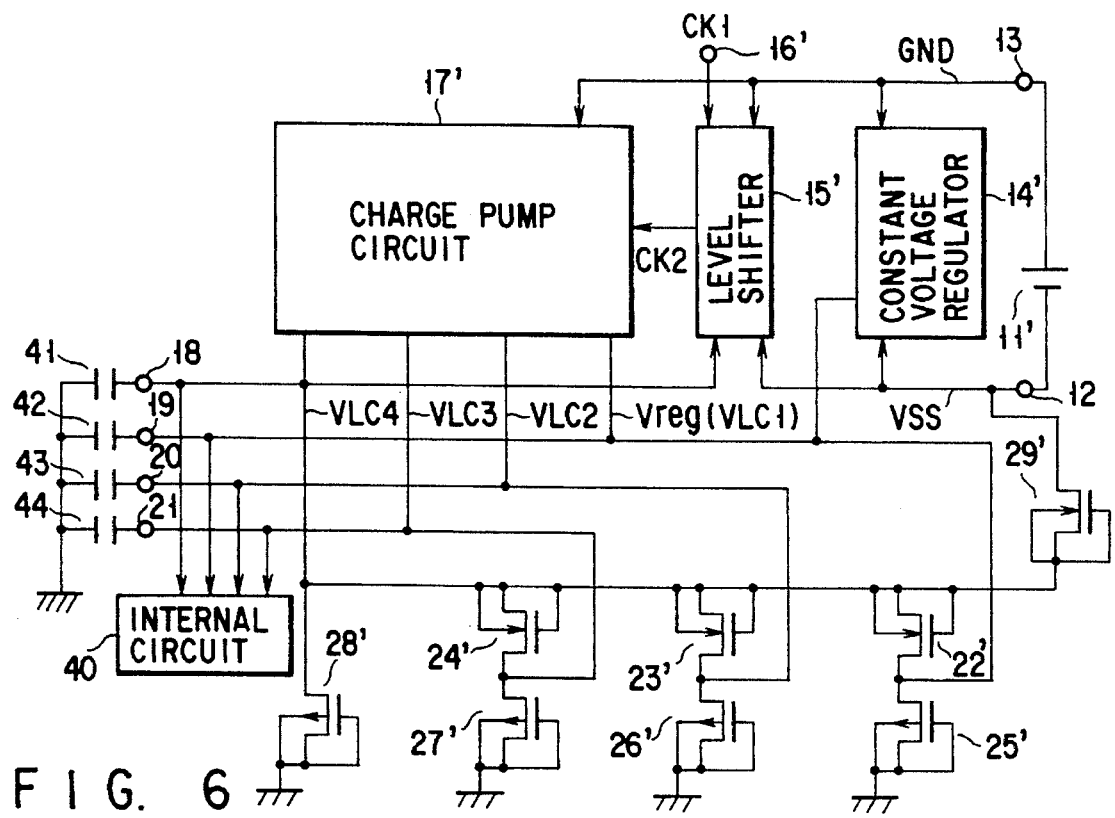
FIG. 6 is a block diagram, showing a modification of the voltage transforming circuit according to the first embodiment of the invention.
Figure 7:
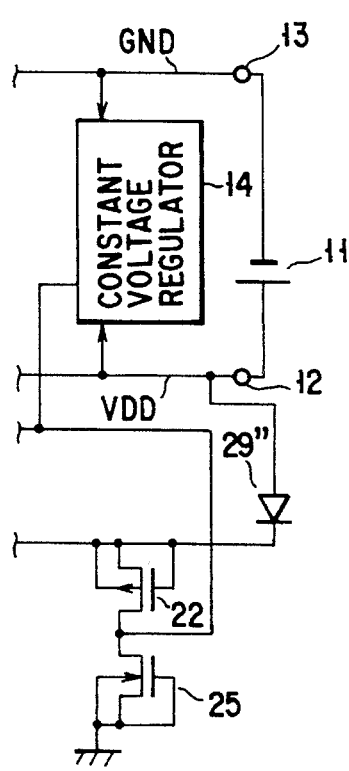
FIGS. 7 and 8 are block diagrams, showing part of further modifications of the voltage transforming circuit according to the first embodiment of the invention.
Figure 8:
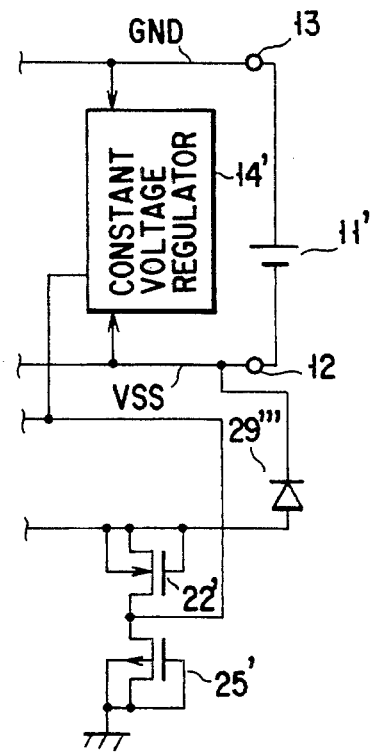

Although an explanation has been made of a case where the external power source supplies a positive voltage, the same explanation can be made of a case where the source supplies a negative voltage. FIG. 6 shows such a negative voltage case. In this case, the structure of the integrated circuit is similar to the FIG. 4 structure except that the PMOS transistors are replaced with NMOS ones and the NMOS transistors with PMOS ones. Moreover, since the PMOS transistor 29 in FIG. 4 is equivalent to a diode (one-way conductive element), it may be replaced with a diode 29" as shown in FIG. 7. In the case of using a negative power source as the external power source 11, a diode 29'" may be used as shown in FIG. 8. Although FIGS. 7 and 8 show only peripheral circuits including the diodes 29" and 29'", the other elements are identical to those shown in FIGS. 4 or 6. Further, the protecting transistors 22–28 (FIG. 4) and 22'–28' (FIG. 6) may be replaced with diodes.

Figure 9:
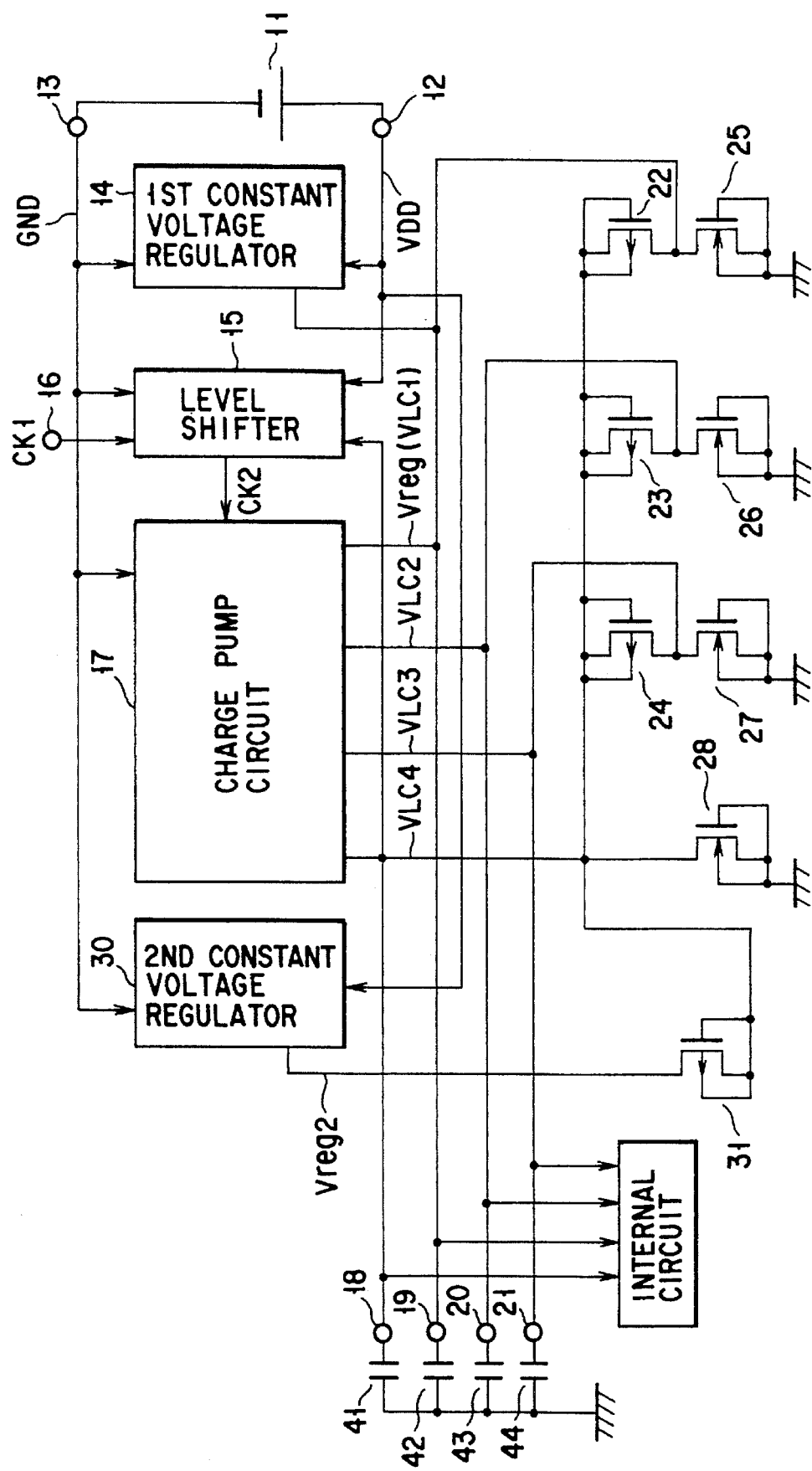
FIG. 9 is a block diagram, showing a voltage transforming circuit according to a second embodiment of the invention.

FIG. 9 is a block diagram, showing a voltage transforming circuit according to a second embodiment of the invention. Since the second embodiment is similar to the first embodiment, an explanation will be given of only elements which differ from those in the first embodiment. The second embodiment does not employ the P-channel MOS transistor 29 for setting the initial value of the voltage VLC4, but employs a second constant-voltage regulator 30 and a P-channel MOS transistor 31 for setting the initial voltage, in addition to the first constant-voltage regulator 14. The second constant-voltage regulator 30 creates, from the voltage VDD, a voltage Vreg2 which is lower than the voltage VDD and higher than the output voltage Vreg of the first constant-voltage regulator 14. The P-channel MOS transistor 31 has its gate and back gate connected to its source, and serves as an element equivalent to a diode (one-way conductive element). The Vreg side and VLC side of the transistor 31 correspond to the anode and cathode of the diode, respectively.

In the voltage transforming circuit constructed as above, the output voltage Vreg2 of the second constant-voltage regulator 30 is set, for example, to 2 V. Accordingly, the initial value of the voltage VLC4 is 1.5 V (=Vreg2 (2 V)–VF (0.5 V)). Since the initial value is higher than the voltage VDDmin of the level shifter 15, the level shifter 15 can operate in a reliable manner even in an initial state, and accordingly the operation of the step-up circuit 17 controlled by the clock signal CK2 output from the level shifter 15 can be stabilized.

The above-described circuit can provide a further advantage as follows:

In the first embodiment in which the initial value of the voltage VLC4 is set with the use of the voltage VDD of the battery 11, the step-up operation of the step-up circuit 17 is sufficiently stabilized, and a current is supplied from the battery 11 until the voltage VLC4 exceeds (VDD–VF), i.e., 2.5 V. Thus, until then, the power consumption of the battery 11 is high. On the other hand, since in the second embodiment, the initial value setting of the voltage VLC4 is performed on the basis of the voltage Vreg lower than the voltage VDD of the battery 11, the step-up operation of the step-up circuit 17 is sufficiently stabilized, and the supply of a current is stopped when the voltage VLC4 has exceeded (Vreg2–VF), i.e., 1.5 V. Thus, the second embodiment can save power more than the first embodiment. Further, after the step up operation of the step-up circuit 17 is fully stabilized, the voltage transforming circuit of this embodiment can be normally operated even when the voltage VLC4 is less than the voltage VDD.

Although in the FIG. 9 circuit, a positive voltage source is used as the external power source 11, a negative voltage source may be used instead. FIG. 10 shows a modification in which a negative voltage source is used. The FIG. 10 structure is similar to the FIG. 9 structure except that the PMOS transistors are replaced with NMOS ones and the NMOS transistors with PMOS ones. In addition, a MOS transistor 31" or 31'" for setting the initial value of the voltage VLC4 can be replaced with a diode. FIGS. 11 and 12 show such cases. Although FIGS. 11 and 12 show only peripheral circuits including the diodes 31" and 31'", the other elements are identical to those shown in FIGS. 9 or 10. Further, the protecting transistors 22–28 (FIG. 4) and 22'–28' (FIG. 6) may be replaced with diodes.

It is a matter of course that the invention is not limited to the above-described embodiments, but can be modified in various manners. For example, although in the embodiments the step-up circuit 17 creates four different voltages by step-up operation, the circuit 17 can be modified to create two, six or eight different voltages. Furthermore, although the MOS transistors as protect elements are used as elements equivalent to diodes, diodes may be used in place of the MOS transistors, or diode-connected bipolar transistors may be used. Also, the battery 11 as the external power source may be a dry battery, a lithium battery, a solar cell, etc. As described above, the invention can provide a voltage transforming circuit capable of causing the internal circuit to perform normal operations even when protect elements are provided therein for protecting the internal circuit from a surge voltage applied to the external terminals, thereby reliably producing a plurality of different output voltages.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A voltage transforming circuit comprising:
   a constant-voltage regulator circuit for receiving a first voltage from a voltage source and outputting a second voltage having the same polarity as the first voltage and a predetermined absolute value lower than the first voltage;
   a step-up circuit, having a plurality of output terminals, for receiving the second voltage and a first synchronization signal, the step-up circuit stepping up the absolute value of the second voltage and controlling the operation of charging capacitors, thereby outputting from the output terminals a plurality of stepped-up voltages of the same polarity having absolute values higher than the second voltage;
   a level shifter circuit for receiving a second synchronization signal which uses the first voltage as one of logic levels, and receiving that one of the stepped-up voltages which has a highest absolute value higher than that of the first voltage, the level shifter circuit shifting the voltage of the one of logic levels to the highest absolute value of the stepped-up voltages, thereby creating the first synchronization signal; and
   a one-way conductive element connected between the voltage source and that one of the output terminals of the step-up circuit from which the stepped-up voltage of the highest absolute value is output, so that a voltage substantially equal to the first voltage can be applied to the one of the output terminals immediately after the first voltage is applied to the constant-voltage regulator circuit.

2. The voltage transforming circuit according to claim 1, wherein at least the constant-voltage regulator circuit, the step-up circuit, the level shifter circuit and the one-way conductive element are formed integral as an integrated circuit.

3. The voltage transforming circuit according to claim 2, wherein the step-up circuit includes a charge pump circuit for outputting a plurality of voltages, the output terminals of the charge pump circuit being connected to the changing capacitors provided outside the integrated circuit.

4. The voltage transforming circuit according to claim 1, wherein the one-way conductive element consists of a diode having an anode and a cathode, the anode and the cathode being respectively connected to the voltage source and the one of the output terminals of the step-up circuit from which the stepped-up voltage of the highest absolute value is output, when the first voltage has a positive value.

5. The voltage transforming circuit according to claim 1, wherein the one-way conductive element consists of a diode having an anode and a cathode, the cathode and the anode being respectively connected to the voltage source and the one of the output terminals of the step-up circuit from which the stepped-up voltage of the highest absolute value is output, when the first voltage has a negative value.

6. The voltage transforming circuit according to claim 1, wherein the one-way conductive element consists, when the first voltage has a positive value, of a PMOS transistor having a source, a gate and a back gate which are connected to each other, and also having a drain supplied with the first voltage, the source being connected to the one of the output terminals of the step-up circuit from which the stepped-up voltage of the highest absolute value is output.

7. The voltage transforming circuit according to claim 1, wherein the one-way conductive element consists, when the first voltage has a negative value, of an NMOS transistor having a source, a gate and a back gate which are connected to each other, and also having a drain supplied with the first voltage, the source being connected to the one of the output terminals of the step-up circuit from which the stepped-up voltage of the highest absolute value is output.

8. A voltage transforming circuit comprising:

a first constant-voltage regulator circuit for receiving a first voltage from a voltage source and outputting a second voltage having the same polarity as the first voltage and a predetermined absolute value lower than the first voltage;

a step-up circuit, having a plurality of output terminals, for receiving the second voltage and a first synchronization signal, the step-up circuit stepping up the absolute value of the second voltage and controlling the operation of charging capacitors, thereby outputting from the output terminals a plurality of stepped-up voltages of the same polarity having absolute values higher than the second voltage;

a level shifter circuit for receiving a second synchronization signal which uses the first voltage as one of logic levels, and receiving that one of the stepped-up voltages which has a highest absolute value, the level shifter circuit shifting the voltage of the one of logic levels to the highest absolute value of the stepped-up voltages, thereby creating the first synchronization signal;

a second constant-voltage regulator circuit having an input terminal for receiving the first voltage, and an output terminal for outputting a third voltage having a predetermined absolute value lower than that of the first voltage and higher than that of the second voltage, and having the same polarity as the first and second voltages; and a one-way conductive element connected between the output terminal of the third voltage and that one of the output terminals of the step-up circuit from which the stepped-up voltage of the highest absolute value is output, so that a voltage substantially equal to the third voltage can be applied to the one of the output terminals of the step-up circuit immediately after the first voltage is applied to the first constant-voltage regulator circuit.

9. The voltage transforming circuit according to claim 8, wherein at least the first constant-voltage regulator circuit, the step-up circuit, the level shifter circuit, the second constant-voltage regulator circuit and the one-way conductive element are formed integral as an integrated circuit.

10. The voltage transforming circuit according to claim 9, wherein the step-up circuit includes a charge pump circuit for outputting a plurality of voltages, the output terminals of the charge pump circuit being connected to the charging capacitors provided outside the integrated circuit.

11. The voltage transforming circuit according to claim 8, wherein the one-way conductive element consists of a diode having an anode and a cathode, the anode and the cathode being respectively connected to the output terminal for the third voltage and the one of the output terminals of the step-up circuit from which the stepped-up voltage of the highest absolute value is output, when the first voltage has a positive value.

12. The voltage transforming circuit according to claim 8, wherein the one-way conductive element consists of a diode having an anode and a cathode, the cathode and the anode being respectively connected to the output terminal for the third voltage and the one of the output terminals of the step-up circuit from which the stepped-up voltage of the highest absolute value is output, when the first voltage has a negative value.

13. The voltage transforming circuit according to claim 8, wherein the one-way conductive element consists, when the first voltage has a positive value, of a PMOS transistor having a source, a gate and a back gate which are connected to each other, and also having a drain supplied with the third voltage, the source being connected to the one of the output terminals of the step-up circuit from which the stepped-up voltage of the highest absolute value is output.

14. The voltage transforming circuit according to claim 8, wherein the one-way conductive element consists, when the first voltage has a negative value, of an NMOS transistor having a source, a gate and a back gate which are connected to each other, and also having a drain supplied with the third voltage, the source being connected to the one of the output terminals of the step-up circuit from which the stepped-up voltage of the highest absolute value is output.

\* \* \* \* \*